United States Patent
Emberling et al.

(10) Patent No.: US 7,023,444 B2
(45) Date of Patent: Apr. 4, 2006

(54) MULTI-TEXTURING BY WALKING AN APPROPRIATELY-SIZED SUPERTILE OVER A PRIMITIVE

(75) Inventors: Brian D. Emberling, San Mateo, CA (US); Michael G. Lavelle, Saratoga, CA (US); Assana M. Fard, Sunnyvale, CA (US); Nandini Ramani, Saratoga, CA (US); David C. Kehlet, Los Altos, CA (US); Michael A. Wasserman, Redwood City, CA (US); Ewa M. Kubalska, San Jose, CA (US); Mark E Pascual, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 358 days.

(21) Appl. No.: 10/393,528

(22) Filed: Mar. 20, 2003

(65) Prior Publication Data
US 2004/0183807 A1  Sep. 23, 2004

(51) Int. Cl.
*G06T 11/40* (2006.01)
(52) U.S. Cl. .................. 345/552; 345/582
(58) Field of Classification Search ........ 345/501–503, 345/506, 582, 557, 552, 418–428, 558, 560, 345/441–443
See application file for complete search history.

(56) References Cited

U.S. PATENT DOCUMENTS

| | | | |
|---|---|---|---|
| 5,945,997 A | 8/1999 | Zhao et al. | |
| 6,459,428 B1 * | 10/2002 | Burk et al. | 345/419 |
| 6,636,218 B1 | 10/2003 | Nelson | |
| 6,762,765 B1 * | 7/2004 | Doyle et al. | 345/565 |
| 6,784,894 B1 | 8/2004 | Schimpf et al. | |
| 2002/0171672 A1 | 11/2002 | Lavelle et al. | |
| 2002/0180747 A1 | 12/2002 | Lavelle et al. | |
| 2003/0142104 A1 | 7/2003 | Lavelle et al. | |

* cited by examiner

*Primary Examiner*—Kee M. Tung
(74) *Attorney, Agent, or Firm*—Meyertons Hood Kivlin Kowert & Goetzel, P.C.; Jeffrey C. Hood; Mark K. Brightwell

(57) ABSTRACT

A rendering unit positions a supertile so that it intersects a primitive. The rendering unit repeatedly walks over bins of the supertile, applying a layer of texture to the bins of the supertile in each iteration of said repeated walking. The rendering unit advances to the next texture layer after having applied the current texture layer to each candidate bin of the supertile. The results of each texture layer application to the bins may be stored in a texture accumulation buffer. The size of the supertile corresponds to the size of the texture accumulation buffer. After applying a last layer of texture to the bins of the supertile, the supertile may be advanced to a new position. The rendering unit traverses the primitive with the supertile so that the union of areas visited by the supertile covers the primitive.

32 Claims, 20 Drawing Sheets

US 7,023,444 B2

MULTI-TEXTURING BY WALKING AN APPROPRIATELY-SIZED SUPERTILE OVER A PRIMITIVE

BACKGROUND OF THE INVENTION

1. Field of the Invention

This invention relates generally to the field of computer graphics and, more particularly, to a system and method for applying multiple textures to a graphical object.

2. Description of the Related Art

The ability to apply multiple textures to graphical objects increases the realism of a rendered scene. Software renderers may be configured to perform multi-texturing. However, many consumers in the graphics marketplace cannot endure the low rendering rate of software renderers. Thus, there exists a significant need for a hardware graphics accelerator and methodology capable of performing multi-texturing with increased speed and efficiency.

SUMMARY

In one set of embodiments, a graphics system includes a rendering unit and a texture memory. The texture memory may be loaded with a plurality of layers of texture data. The rendering unit may be configured to generate data values (e.g., pixels or samples) for graphical primitives (such as triangles) and apply the texture layers to the data values. The multi-textured samples may be stored into a data buffer. In some embodiments, the data values represent samples. A filtering engine may read the multi-textured samples from the data buffer and filter the multi-textured samples to generate pixels. The pixels may be converted into a video signal which drives a display device. In other embodiments, the data values represent pixels. An output processor may read the pixels from the data buffer and convert the pixels into a video signal which drives a display device.

The rendering unit may render a primitive by traversing the primitive with a rectangle until the successive areas visited by the rectangle cover the primitive. At each position of the rectangle, the rendering unit may repeatedly walk over bins in the rectangle, applying a layer of texture to the bins (or to data values associated with the bins) of the rectangle in each iteration of said repeated walking. The rendering unit advances to the next texture layer after having applied the current texture layer to each candidate bin in the rectangle. (A candidate bin is a bin which intersects the primitive.) Between the application of successive texture layers, textured data values corresponding to the candidate bins in the rectangle are stored in a texture accumulation buffer. After applying a last layer of texture to the bins of the rectangle, the rectangle may be advanced to a new position. The size of the rectangle may be configured so that the texture accumulation buffer does not overflow during the repeated walking process. In some embodiments, the size of the rectangle may be chosen so that the number of bins contained by the rectangle times the number of data values per bin equals the capacity of the texture accumulation buffer measured in term of data values.

In another set of embodiments, a method for rendering a primitive may be configured to operate in a processing system (e.g., any combination of programmable hardware and/or dedicated hardware) as follows. The processing system may:

(a) compute a texture coordinate vector for a bin B in a rectangle, where the bin B has a non-empty intersection with the primitive, where the texture coordinate vector corresponds to a first layer of texture stored in a texture memory;

(b) apply a texture value corresponding to the texture coordinate vector to a set of one or more data values (e.g., pixels or samples) populating the bin B, where the texture value is derived from (e.g., computed by means of filtration of texels from) the first layer of texture stored in the texture memory; and (c) store the textured data values for the bin B into a texture accumulation buffer.

In addition, the processing system may:

(d) perform (a), (b) and (c) for each bin B, in the rectangle, which intersects the primitive;

(e) perform (d) for each texture layer stored in the texture memory (or for each texture layer in a selected subset of those stored in the texture memory); and (f) perform (e) for a succession of positions of the rectangle until the primitive has been covered.

The size of the rectangle may be configured so that the number of bins covered by the rectangle times the number of data values per bin equals (or, is less than but approximately equal to) the capacity of the texture accumulation buffer measured in terms of data values.

In yet another set of embodiments, a graphics system may include a texture memory, a texture accumulation buffer, a span walking unit, a texture pipeline and a texture environment unit. The texture memory may be configured to store a plurality of layers of texture data. The span walking unit may be configured to traverse a first primitive with a rectangle of bins, where a union of successive areas visited by the rectangle in said traversal cover the first primitive. For each position P of the rectangle in said traversal, the span walking unit may be configured to repeatedly walk over candidate bins in the rectangle, where each iteration I of said repeated walking over the candidate bins in the rectangle corresponds to a layer $L_I$ of the texture data layers and comprises computing a texture coordinate vector $VEC_{P,I,B}$ for the corresponding layer $L_I$ at each candidate bin B of the candidate bins in the rectangle at position P.

The texture pipeline may be configured to receive each texture coordinate vector $VEC_{P,I,B}$, to read one or more texels from the corresponding texture layer $L_I$ based on the texture coordinate vector $VEC_{P,I,B}$ and to generate a texture value $TV_{P,I,B}$ using the one or more texels.

The texture environment unit may be configured to apply the texture value $TV_{P,I,B}$ to samples of the corresponding candidate bin B in the rectangle at position P and to store the textured samples in the texture accumulation buffer between the application of successive layers of the texture data layers.

In yet another set of embodiments, a method for performing texturing may include:

(a) receiving information defining a geometric primitive;

(b) computing a set of one or more texture coordinates for a bin B in a supertile, where the supertile intersects the primitive, where the set of one or more texture coordinates corresponds to a first layer of texture stored in a texture memory;

(c) applying at least one texture value, corresponding to the set of one or more texture coordinates, to a set of one or more data values associated with the bin B, where said at least one texture value is derived from the first layer of texture stored in the texture memory, where said applying produces one or more textured data values;

(d) storing the one or more textured data values for the bin B into a texture accumulation buffer;

(e) performing (b), (c) and (d) for each bin B that is in the supertile and that intersects the triangle;

(f) performing (e) for each texture layer among a plurality of texture layers stored in the texture memory.

BRIEF DESCRIPTION OF THE DRAWINGS

A better understanding of the present invention can be obtained when the following detailed description is considered in conjunction with the following drawings, in which.

Figure 1:
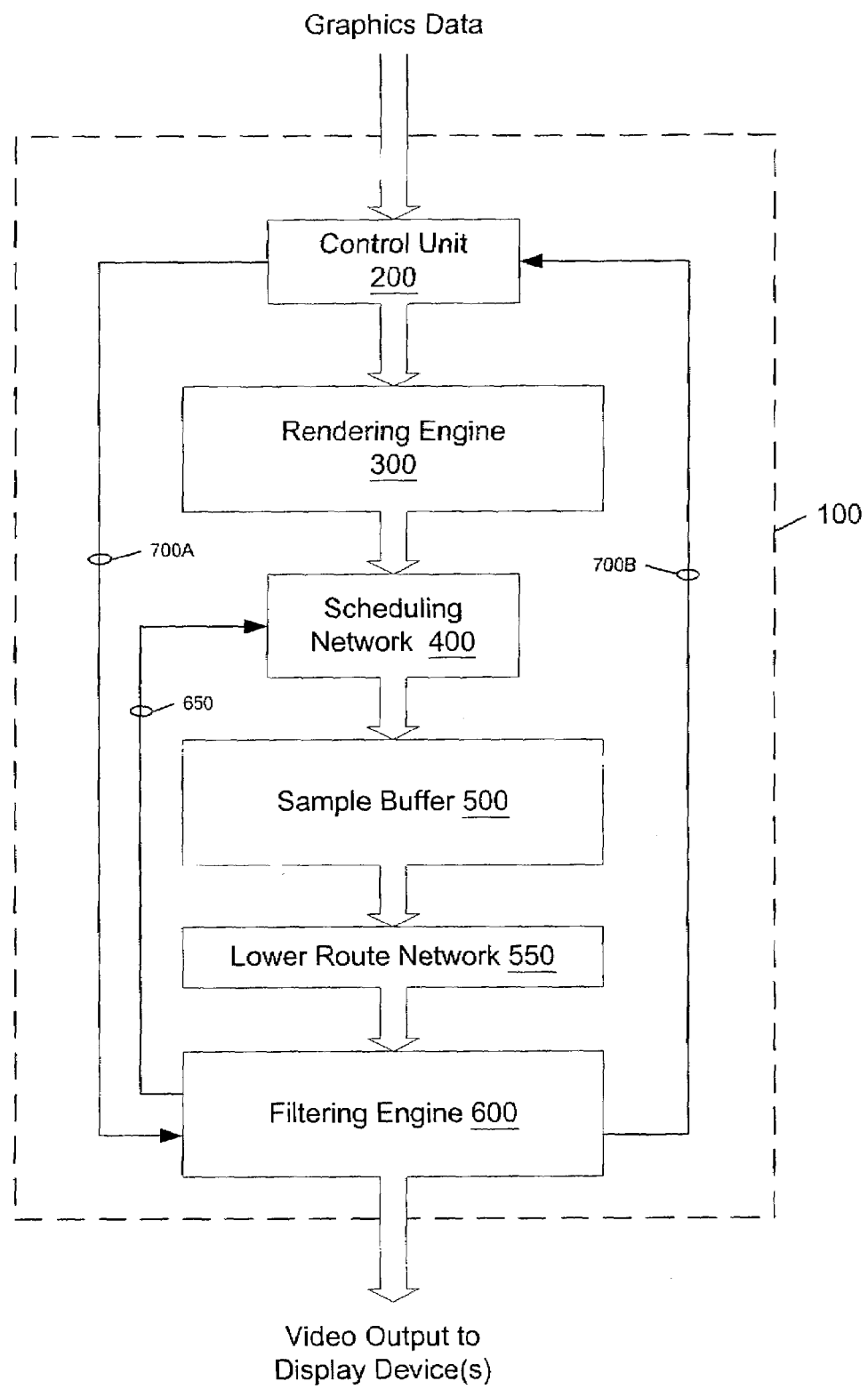
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
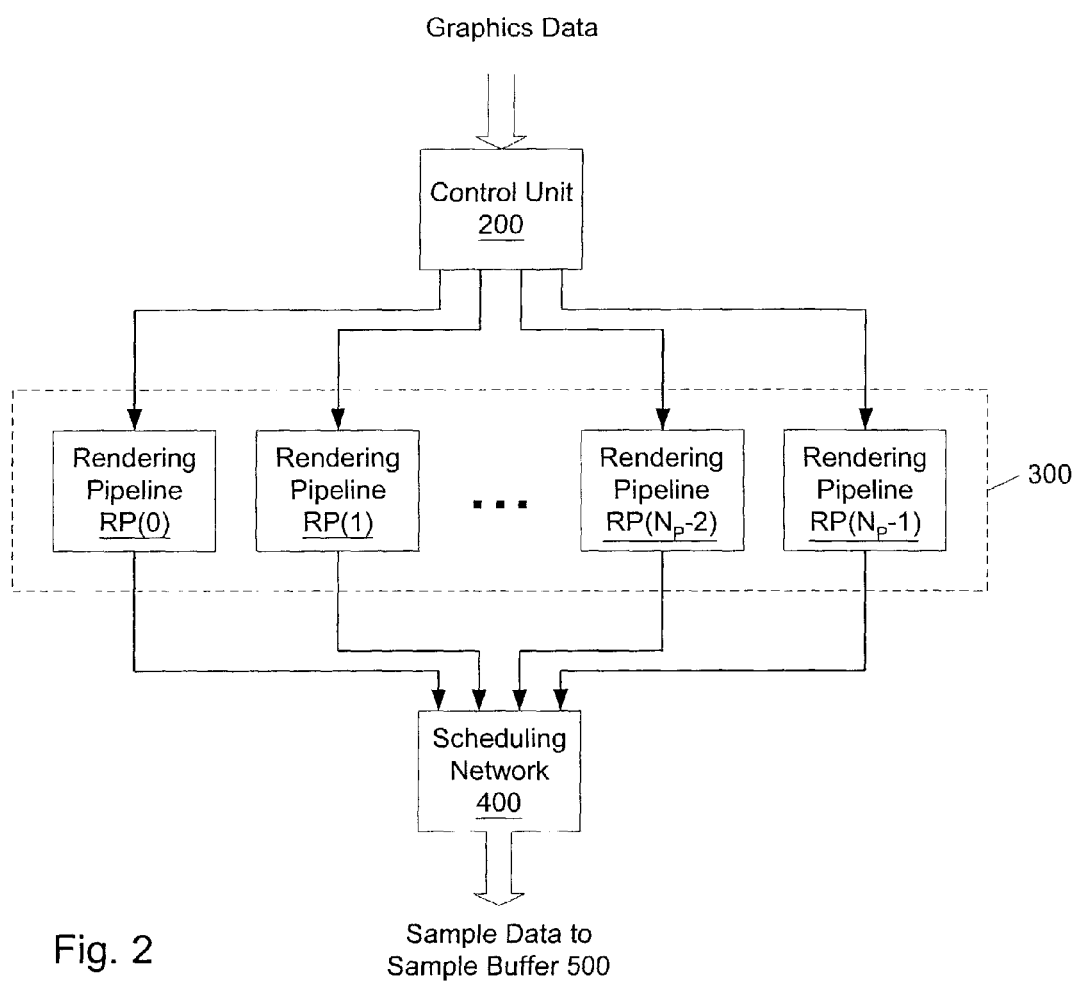
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}=8$.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
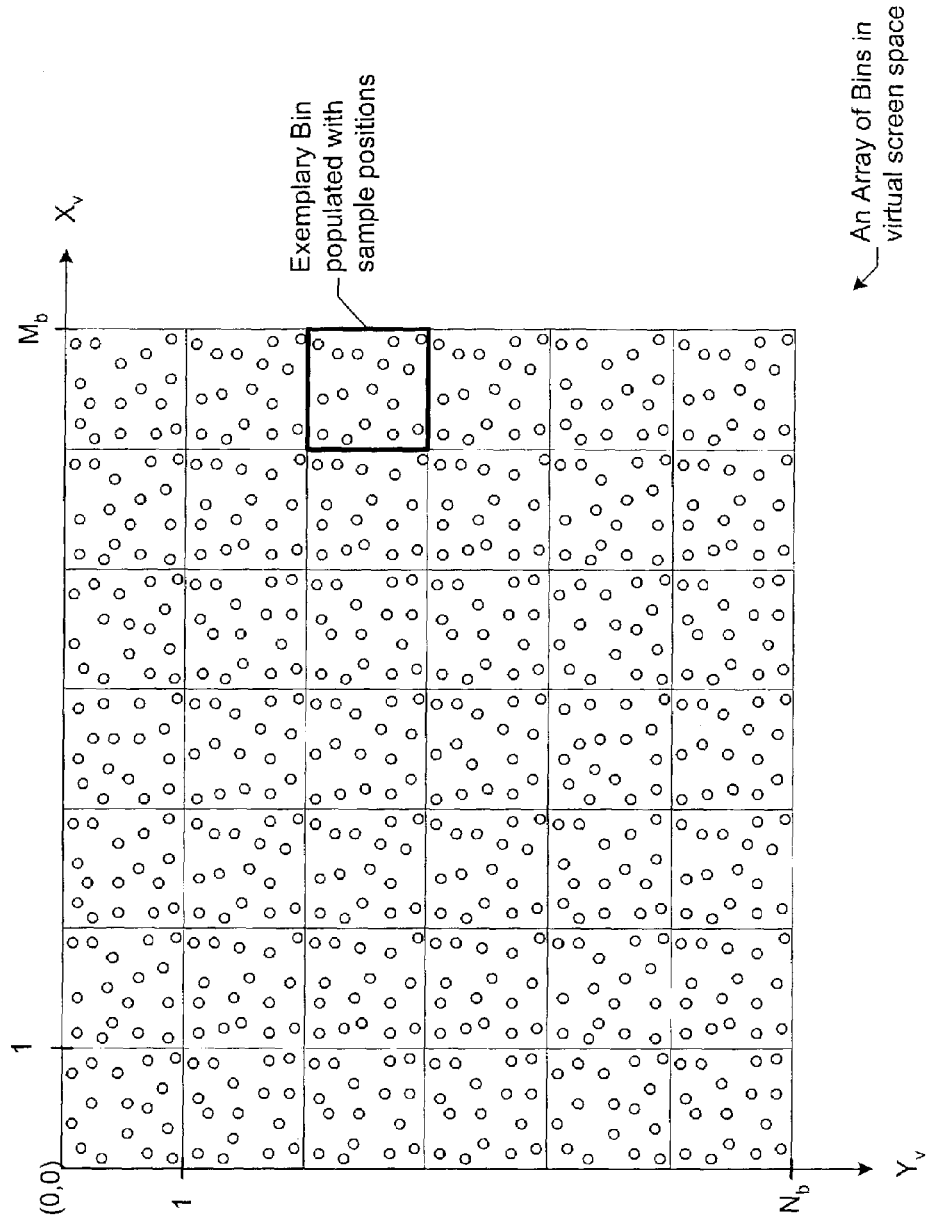
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:
(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
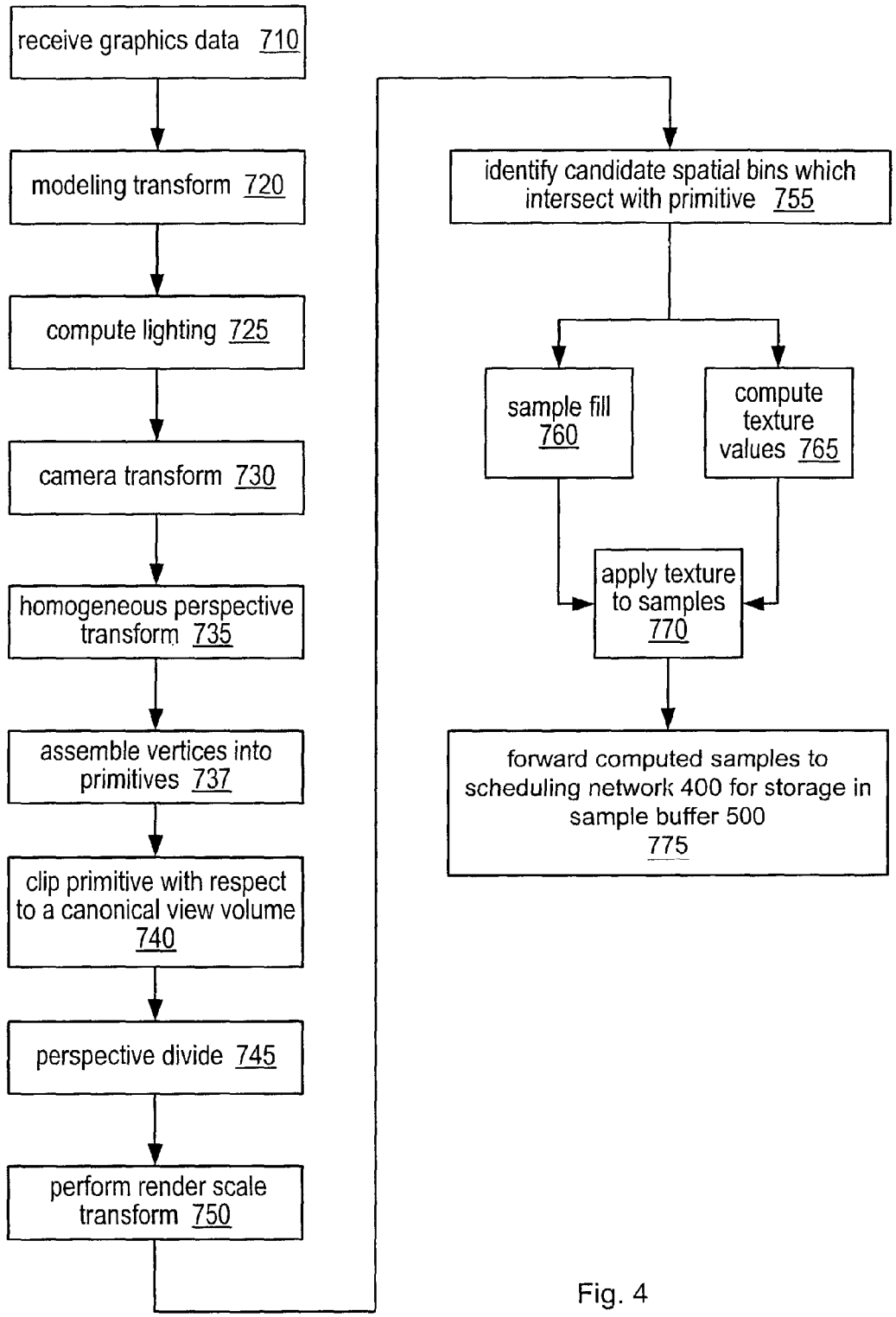
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:
(1) the vertex normals;
(2) the position and orientation of a virtual camera in the world coordinate system;

(3) the intensity, position, orientation and type-classification of light sources; and (4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1 = (-W \leq X)$ $T2 = (X \leq W)$ $T3 = (-W \leq Y)$ $T4 = (Y \leq W)$ $T5 = (-W \leq Z)$ $T6 = (Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations x=X/W y=Y/W z=Z/W.

After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
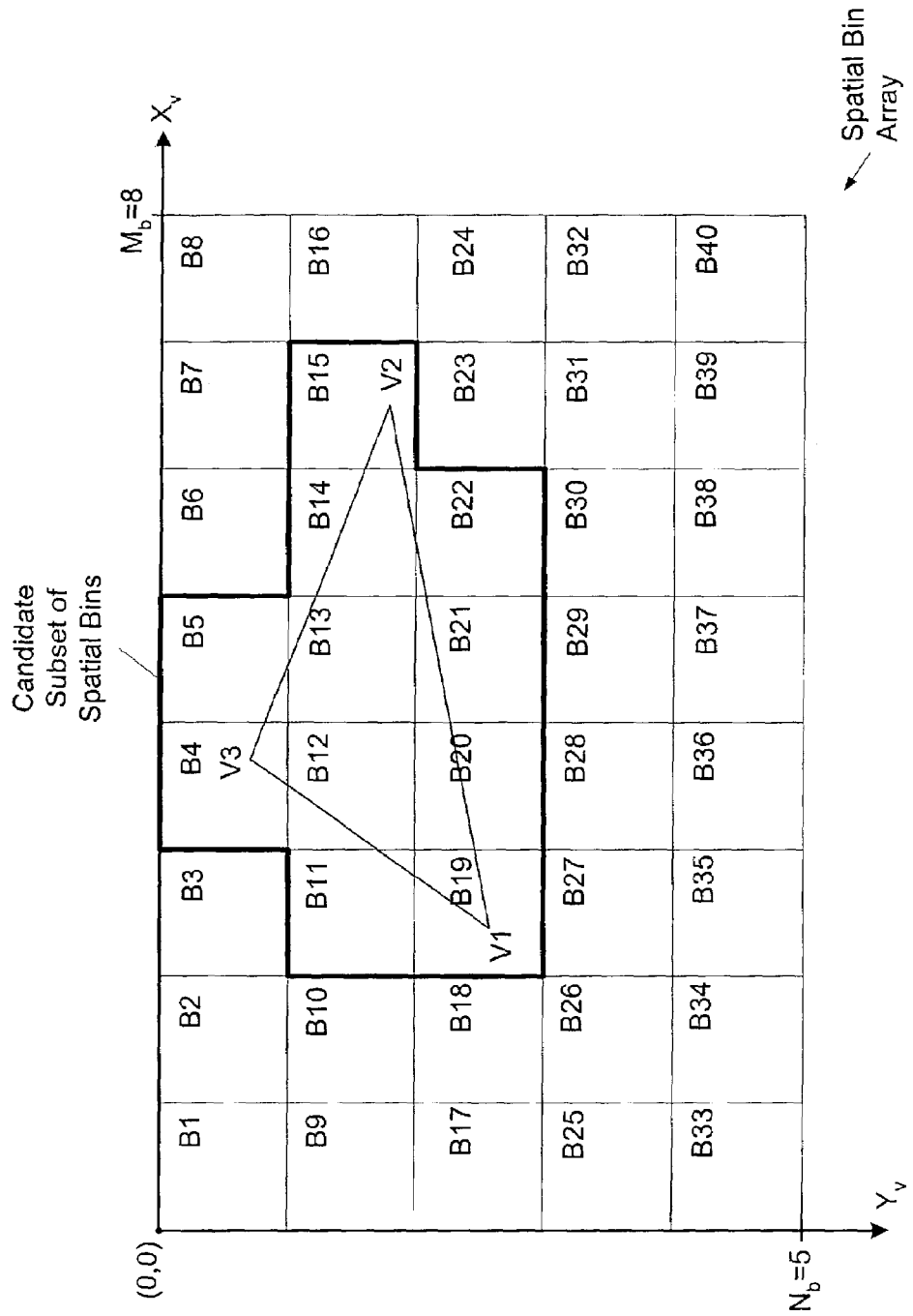
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
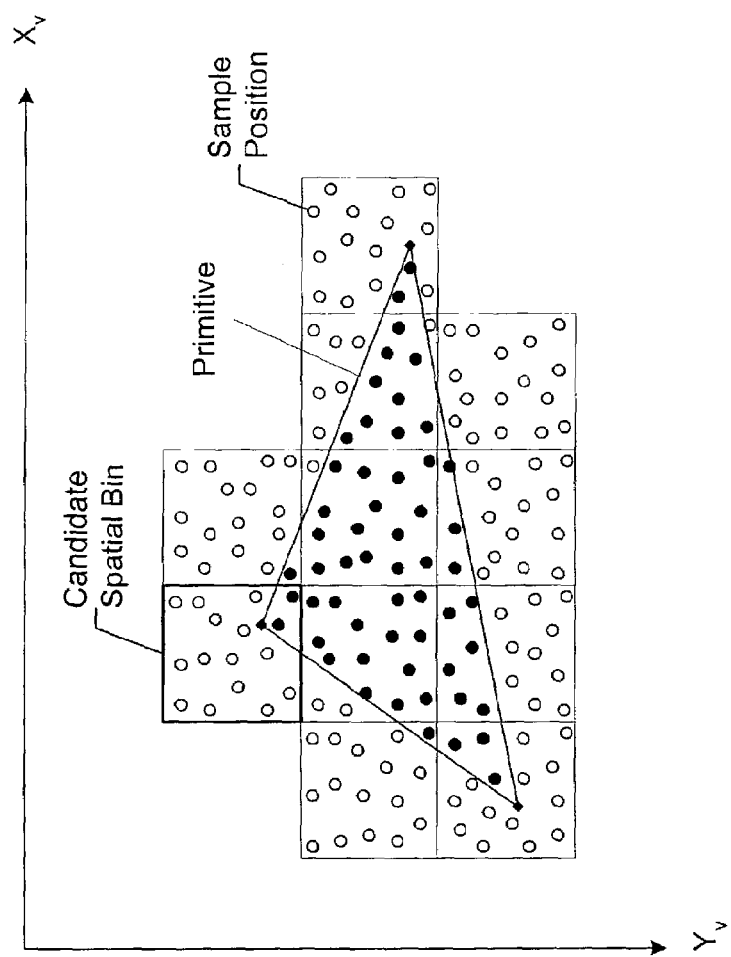
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
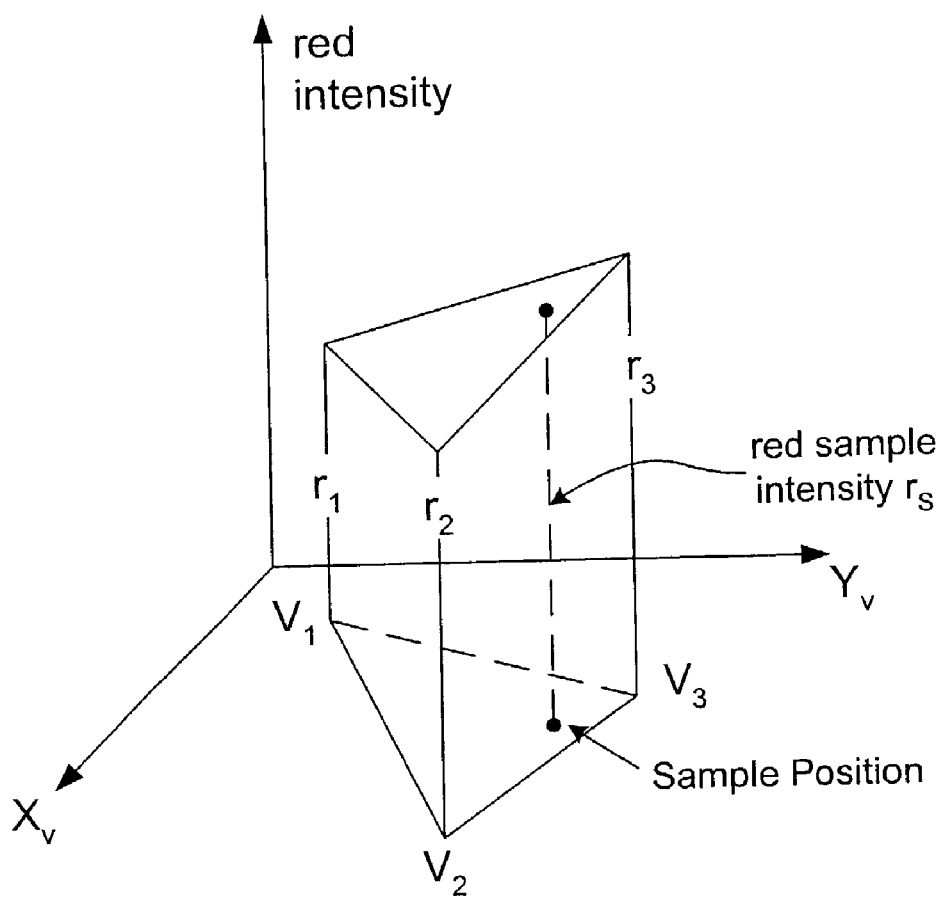
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
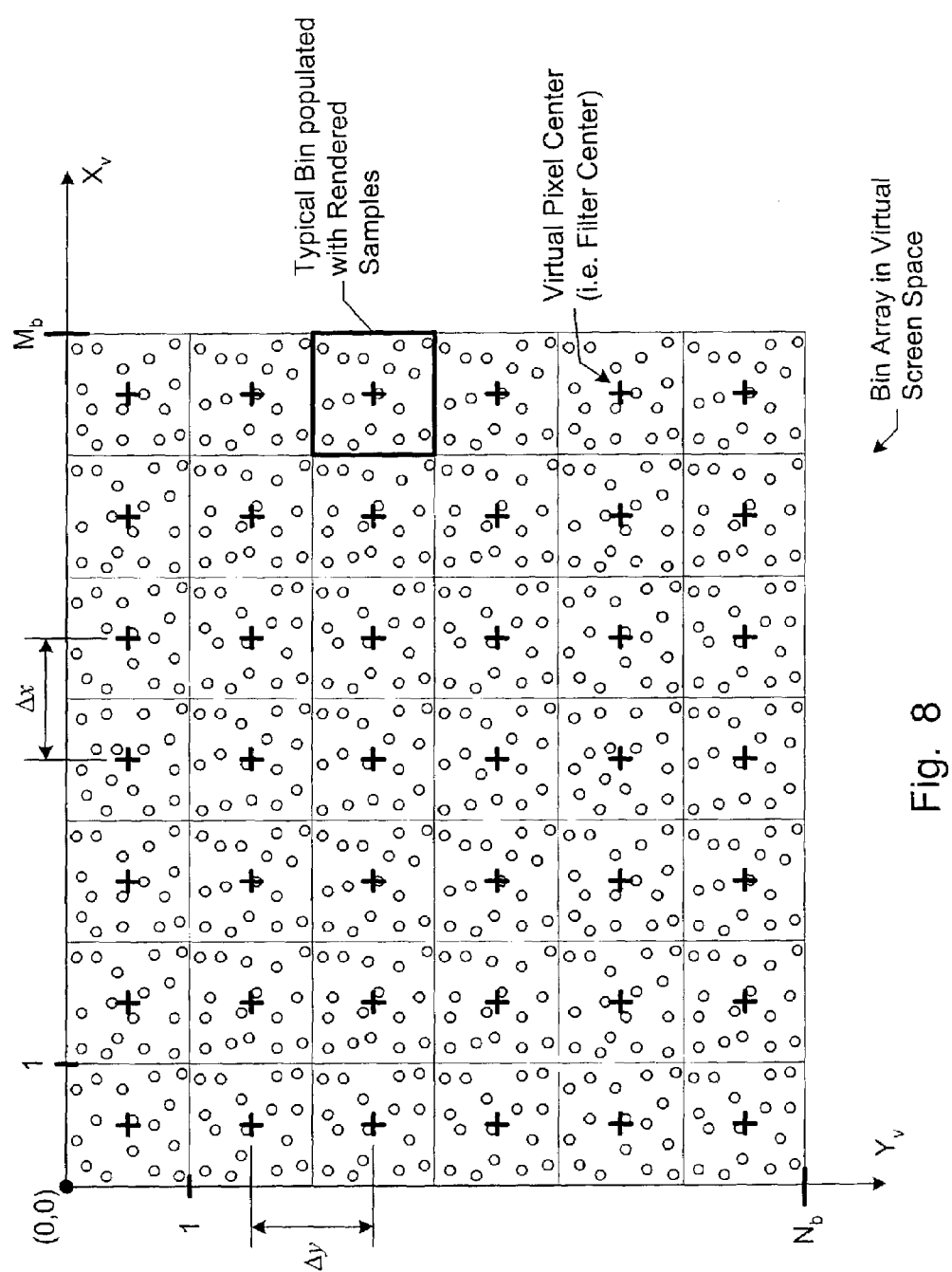
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
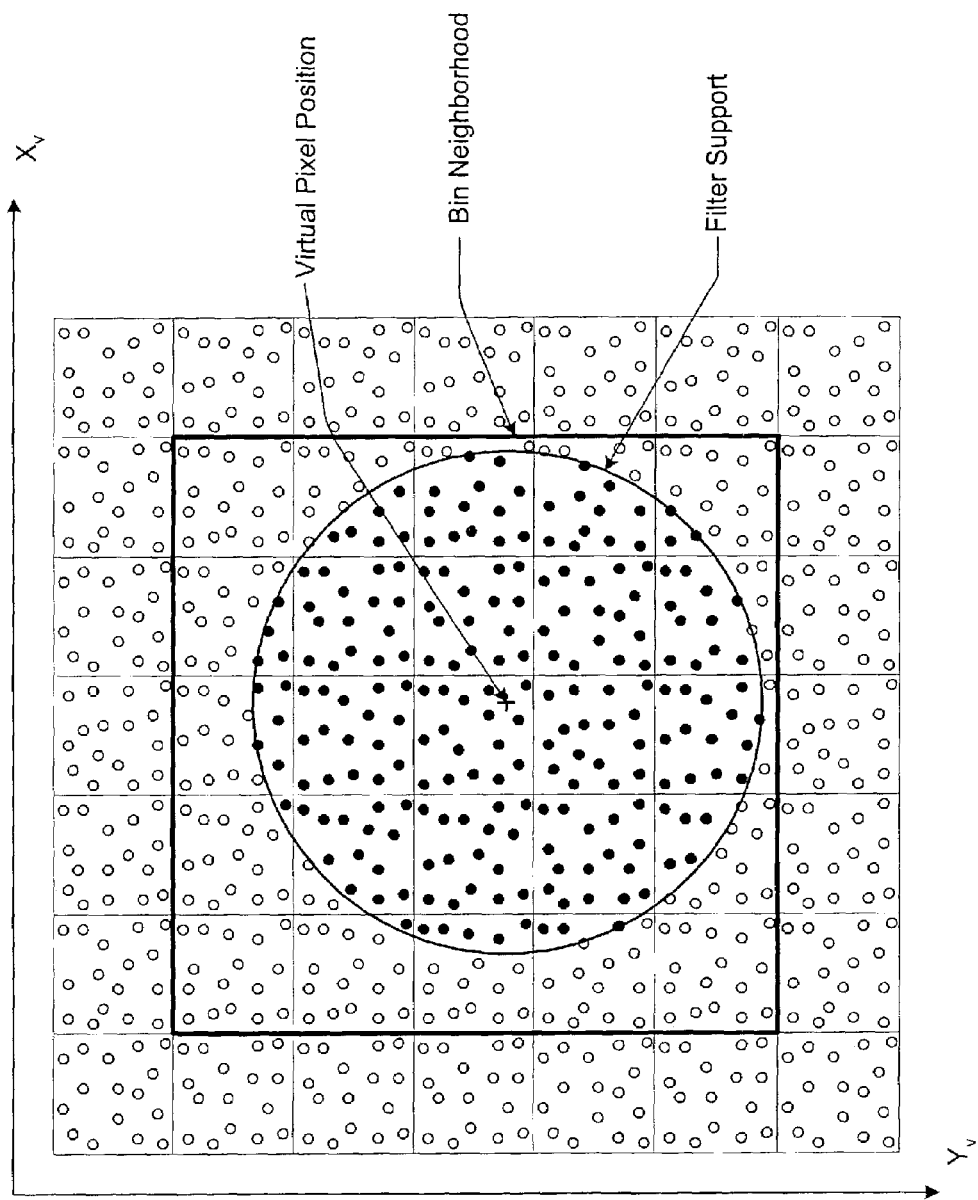
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D^S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_s = (D_s)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P + R_f$, $X_P - R_f$, $Y_P + R_f$, and $Y_P - R_f$. Each sample S in the bin neighborhood may be marked as being valid if the sample's position $(X_S, Y_S)$ falls within the support square, i.e., if $$X_P - R_f < X_S < X_P + R_f \text{ and}$$

$$Y_P - R_f < Y_S < Y_P + R_f.$$

Otherwise the sample S may be marked as invalid. Each valid sample may be assigned the same filter weight value (e.g., $C_S = 1$). It is noted that any or all of the strict inequalities ($<$) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f - 1$) operating in parallel, where the number $N_f$ of filtering units is a positive integer. For example, in one embodiment, $N_f = 4$. In another embodiment, $N_f = 8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f = 4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f = 4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I < M_H(K) {
        PixelValues = Filtration(X_P, Y_P);
        Send PixelValues to Output Buffer;
        X_P = X_P+ΔX(K);
        I = I + 1;
    }
```

-continued

```
Xp=Xstart(K)
Yp=Yp+ΔY(K);
J=J+1;
}
```

The expression Filtration $(X_P, Y_P)$ represents the filtration of samples in the filter support region of the current virtual pixel position $(X_P, Y_P)$ to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
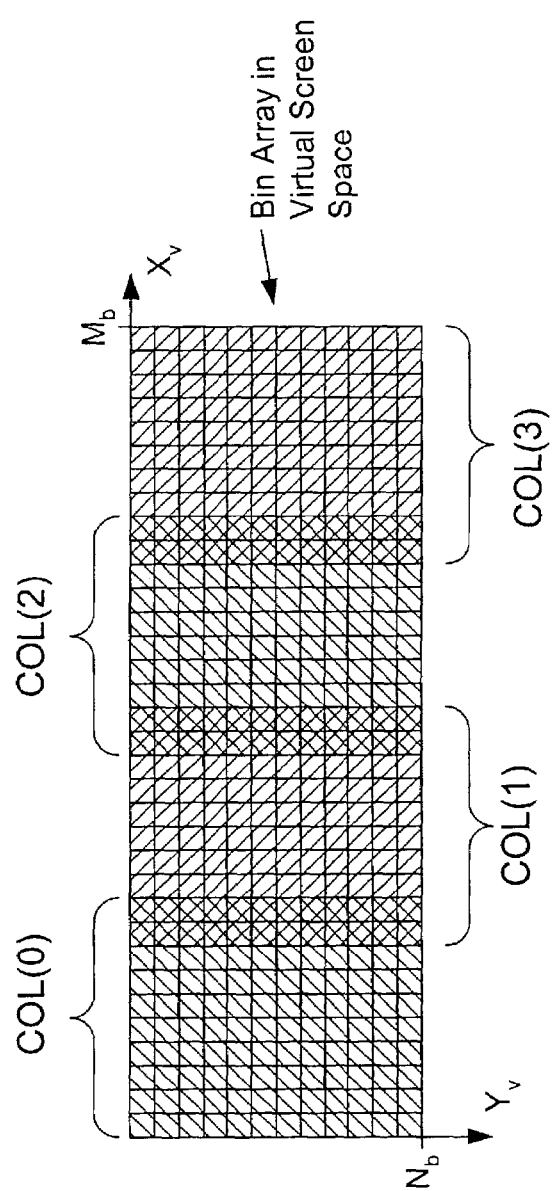
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
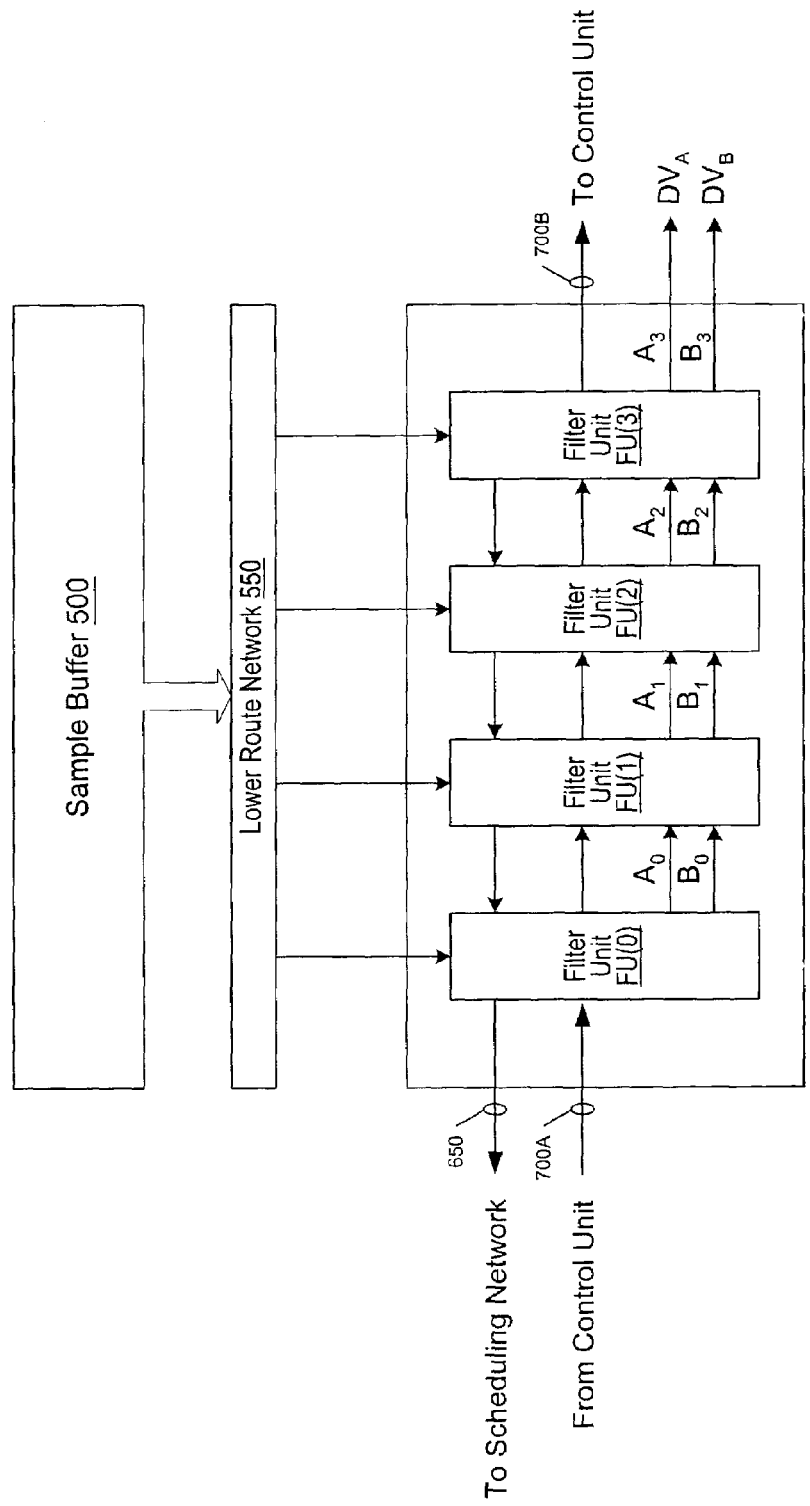
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{N_f-2}$ and $B_{N_f-2}$ from the previous filtering unit FU($N_f$-2), and generates digital video output streams $A_{N_f-1}$ and $B_{N_f-1}$ also referred to as video streams $DV_A$ and $DV_B$ respectively. Video streams $A_0, A_1, \ldots, A_{N_f-1}$ are said to belong to video stream A. Similarly, video streams $B_0, B_1, \ldots, B_{N_f-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
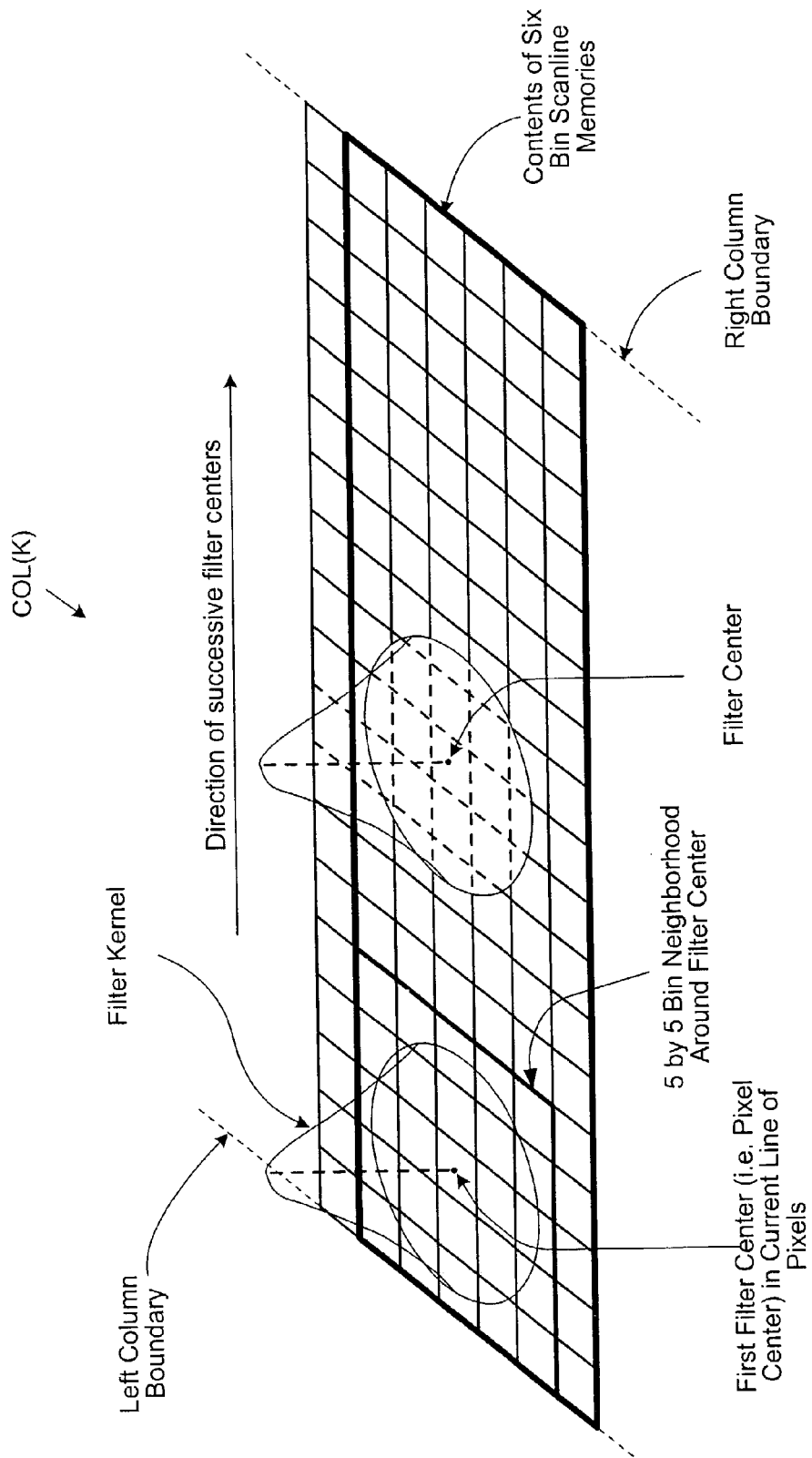
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements ($\Delta X, \Delta Y$). The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.
SRAM is an acronym for static random access memory.
DRAM is an acronym for dynamic random access memory.
SDRAM is an acronym for synchronous dynamic random access memory.
RDRAM is an acronym for Rambus DRAM.

The memory devices of the sample buffer may be organized into $N_{MB}$ memory banks denoted MB(0), MB(1), MB(2), ..., MB($N_{MB}$-1), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:
  30 bits of sample color (for front buffer),
  30 bits of sample color (for back buffer),
  16 bits of alpha and/or overlay,
  10 bits of window ID,
  26 bits of z depth, and
  4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
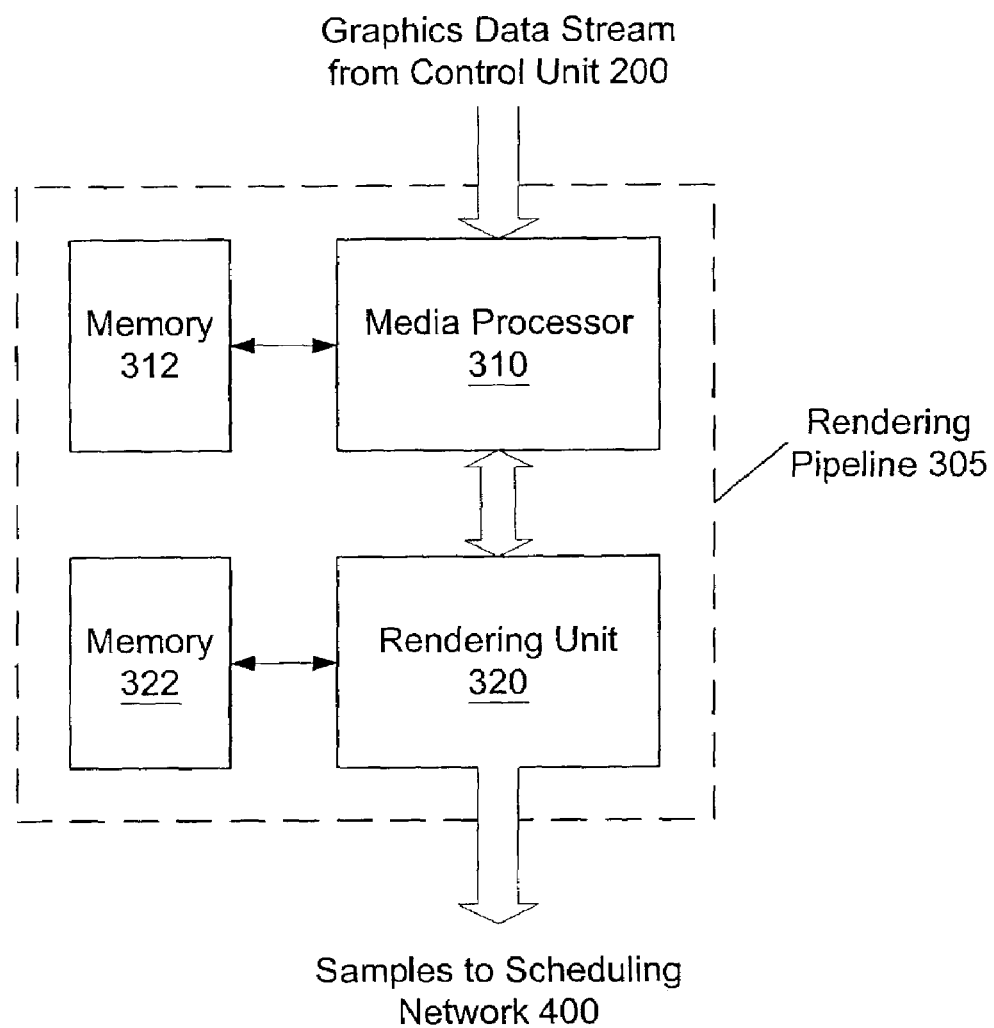
FIG. 13 illustrates one set of embodiments of a rendering pipeline comprising a media processor and a rendering unit.

As described above, the rendering engine 300 may include a set of rendering pipelines RP(0), RP(1), ..., RP($N_{PL}$-1). FIG. 13 illustrates one embodiment of a rendering pipeline 305 that may be used to implement each of the rendering pipelines RP(0), RP(1), ..., RP($N_{PL}$-1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
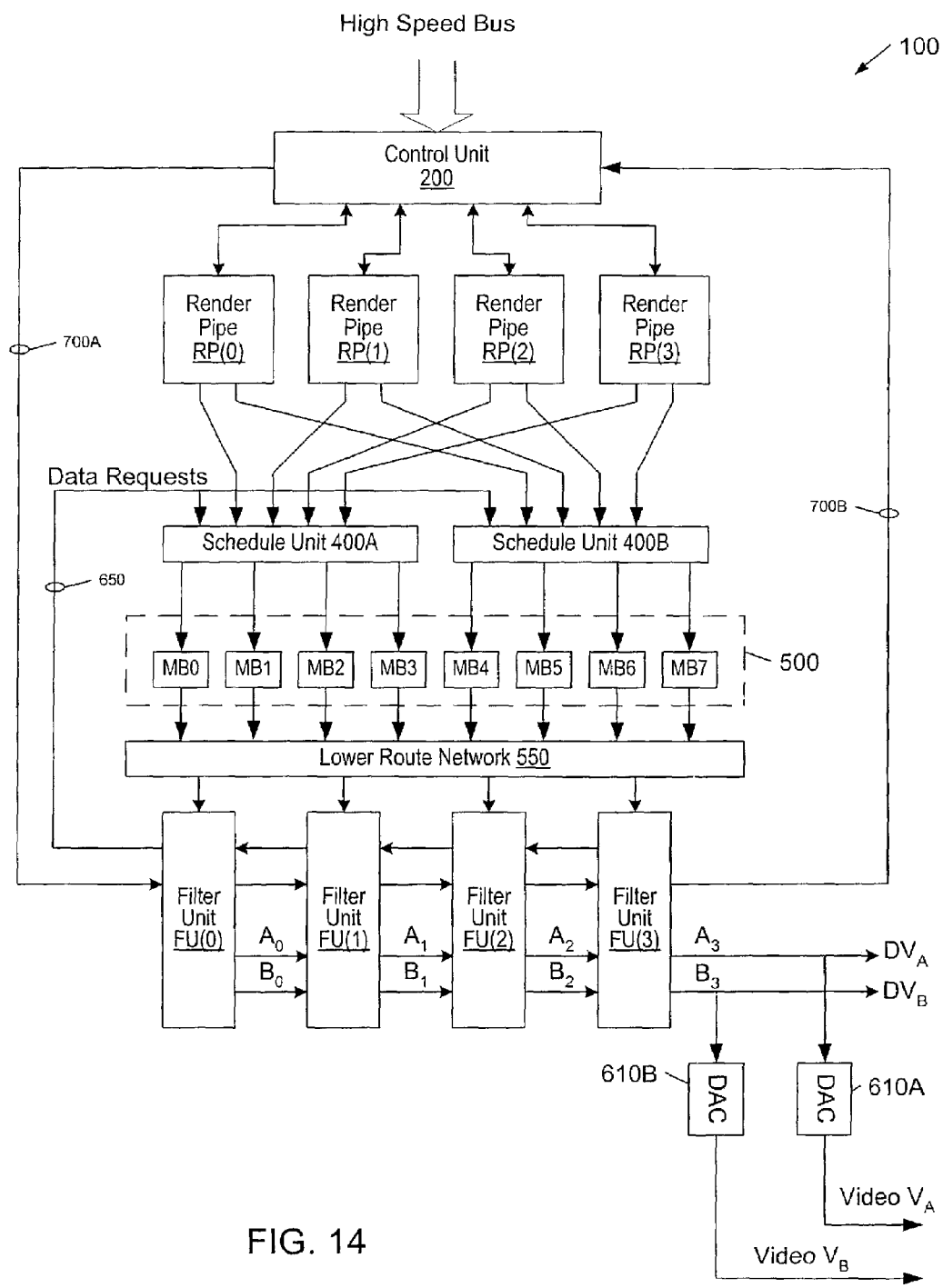
FIG. 14 illustrates one embodiment of graphics accelerator 1100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
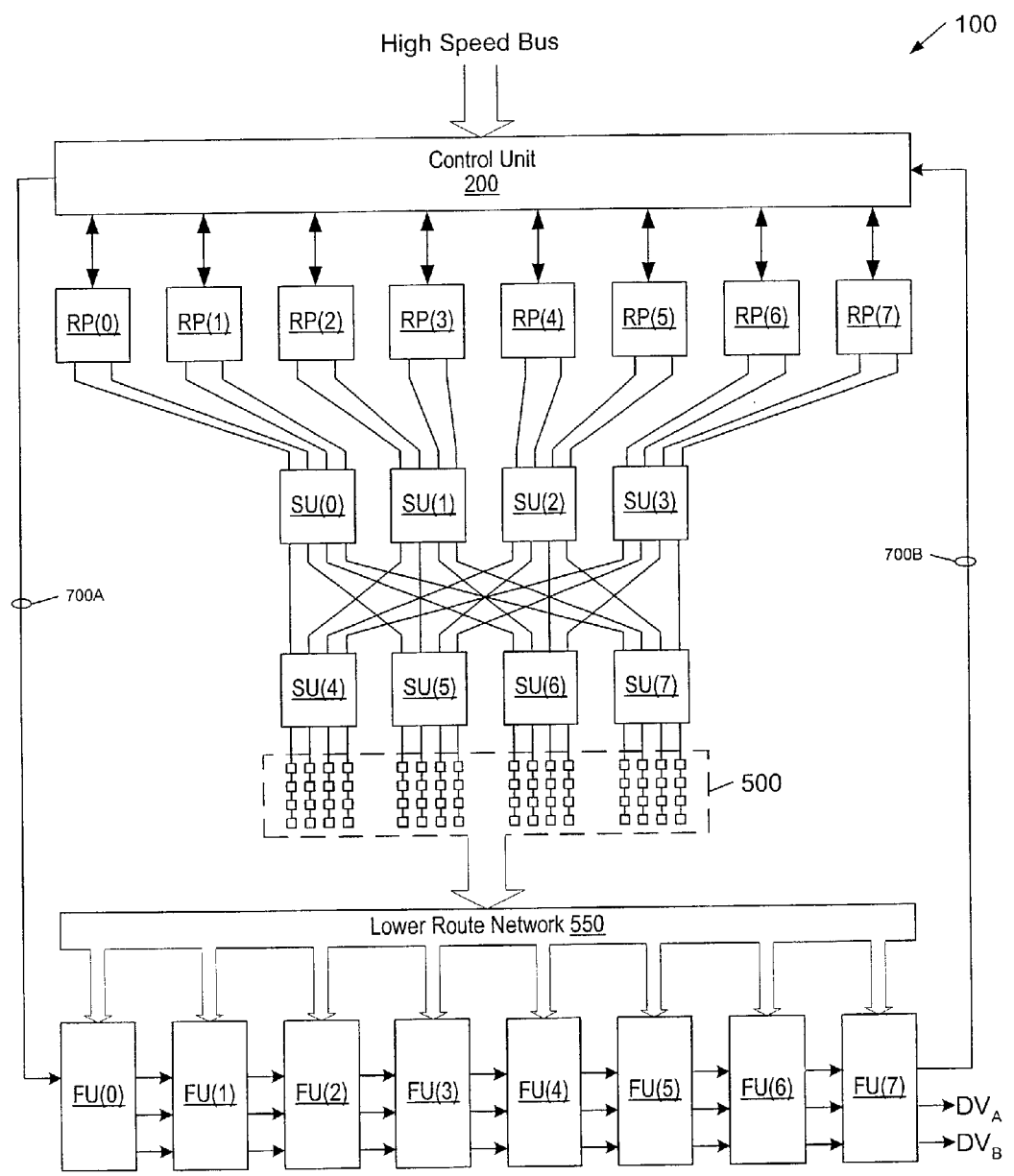
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Media Processor 310

Figure 16:
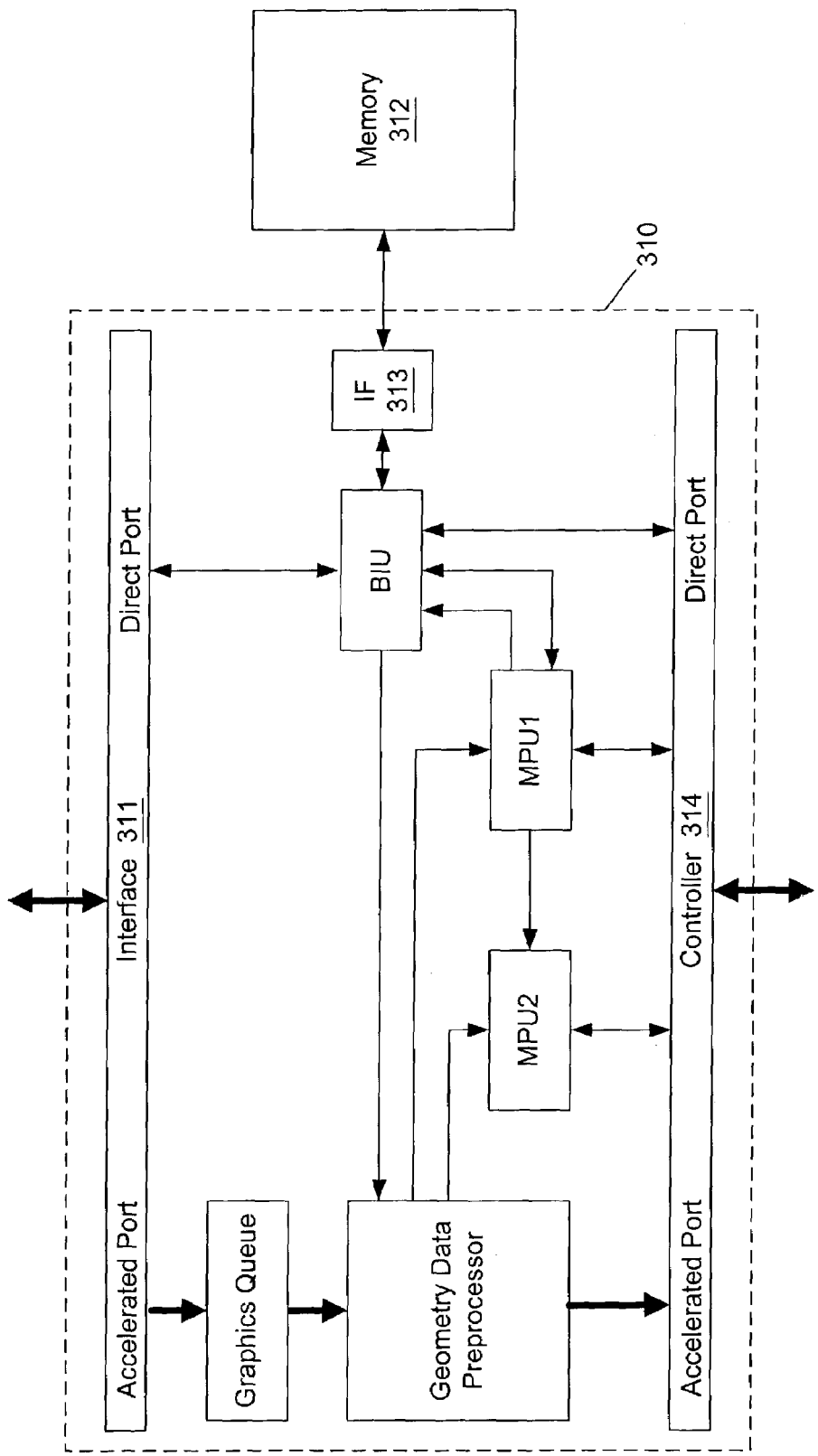
FIG. 16 illustrate one embodiment of a media processor according to one embodiment of graphics accelerator 100.

FIG. 16 illustrates one embodiment of the media processor 310. The media processor 310 receives a stream of graphics data from the control unit 200 through an interface 311. A graphics queue may buffer the stream of data received via the accelerated port of the interface 311. The received graphics data may include graphics primitives. The media processor 310 may also include a geometry data preprocessor (GPP) and one or more microprocessor units (MPUs). The microprocessor units may be programmed to perform vertex transformation, lighting calculations and various other functions, and to send the results to rendering unit 320. The microprocessor units may also have read/write access to texels (i.e. the smallest addressable unit of a texture map) in the rendering unit 320. The geometry data preprocessor GPP may be configured to decompress geometry data, to convert and format vertex data, to dispatch vertices and instructions to the microprocessor units, and to send vertex and attribute tags or register data to rendering unit 320.

Media processor 310 may include an interface 313 to memory 312. Memory 312 may be used for program and/or data storage for the microprocessor units. Memory 312 may also be used to store display lists and/or vertex texture maps.

In addition, media processor 310 may include a controller 314 for interfacing with rendering unit 320. The controller 314 may include an accelerated port path that allows media processor 310 to control rendering unit 320. The bus interface unit BIU provides a path to memory 312 via interface 313 and a path to rendering unit 320 via the controller 314.

Rendering Unit 320

Figure 17:
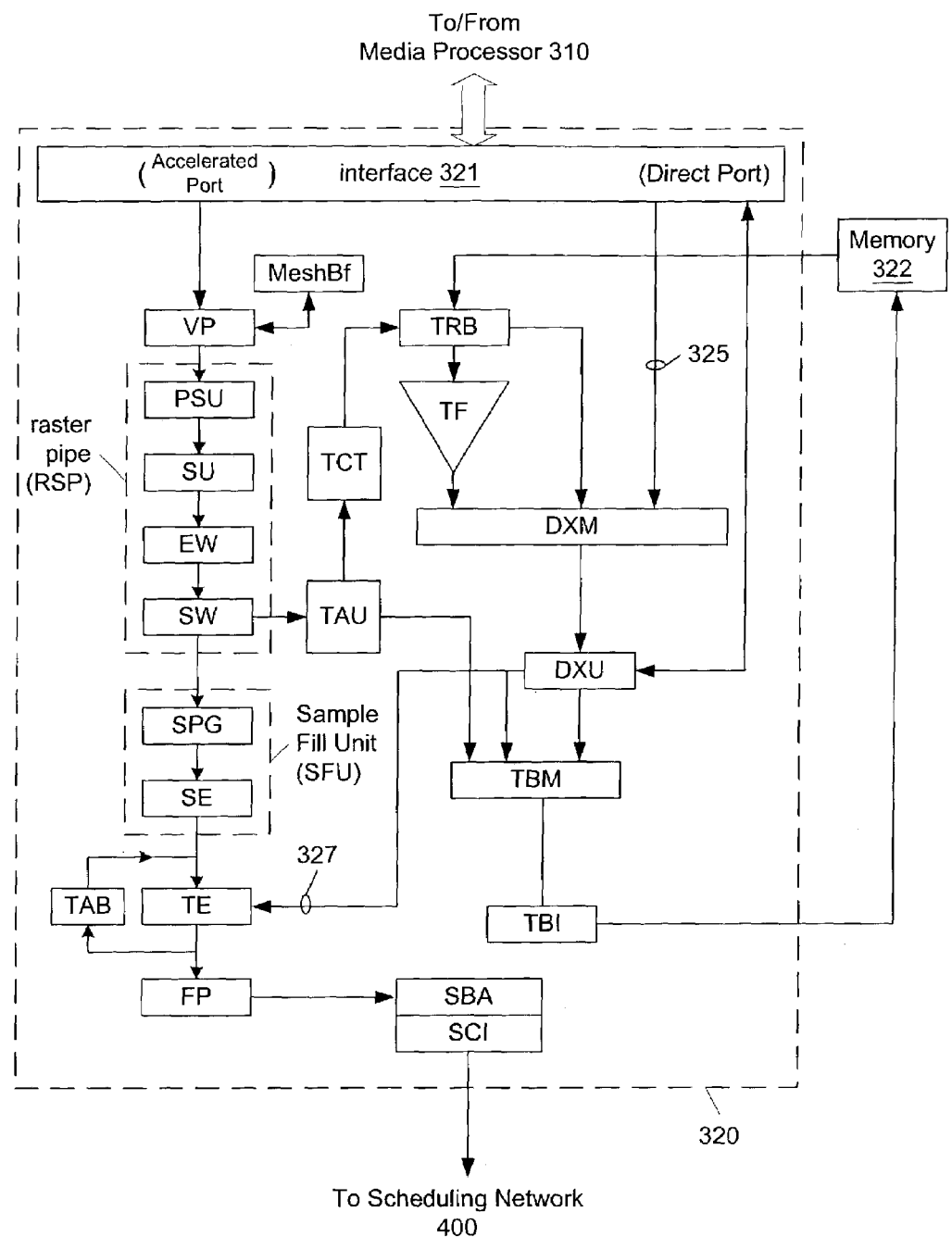
FIG. 17 illustrates one embodiment of a rendering unit according to one embodiment of the rendering pipe RP(K)

FIG. 17 illustrates one embodiment of rendering unit 320. Rendering unit 320 may include an interface 321 for communicating with media processor 310. Interface 321 may receive graphics data and commands from media processor 310, and forward the graphics data and commands to vertex processor VP, data transfer multiplexor DXM, and/or, data transfer unit DXU.

Vertex processor VP may receive a stream of vertices from interface 321 and assemble the vertices into distinct primitives (e.g. triangles), and pass the primitives to a presetup unit PSU. The vertices may carry connectivity information that specifies how the vertices are to be assembled into primitives. Vertices may be saved in and/or retrieved from a mesh buffer.

The presetup unit PSU and setup unit SU may compute parameters for each primitive that will be needed downstream. In one set of embodiments, the PSU and SU may compute, for each primitive, parameters such as the edge slopes, vertical and horizontal rates of change of red, green, blue, alpha, Z and texture coordinates. The presetup unit PSU, setup unit SU, edge walker EW and span walker are collectively referred to as the raster pipe (RSP).

Figure 18:
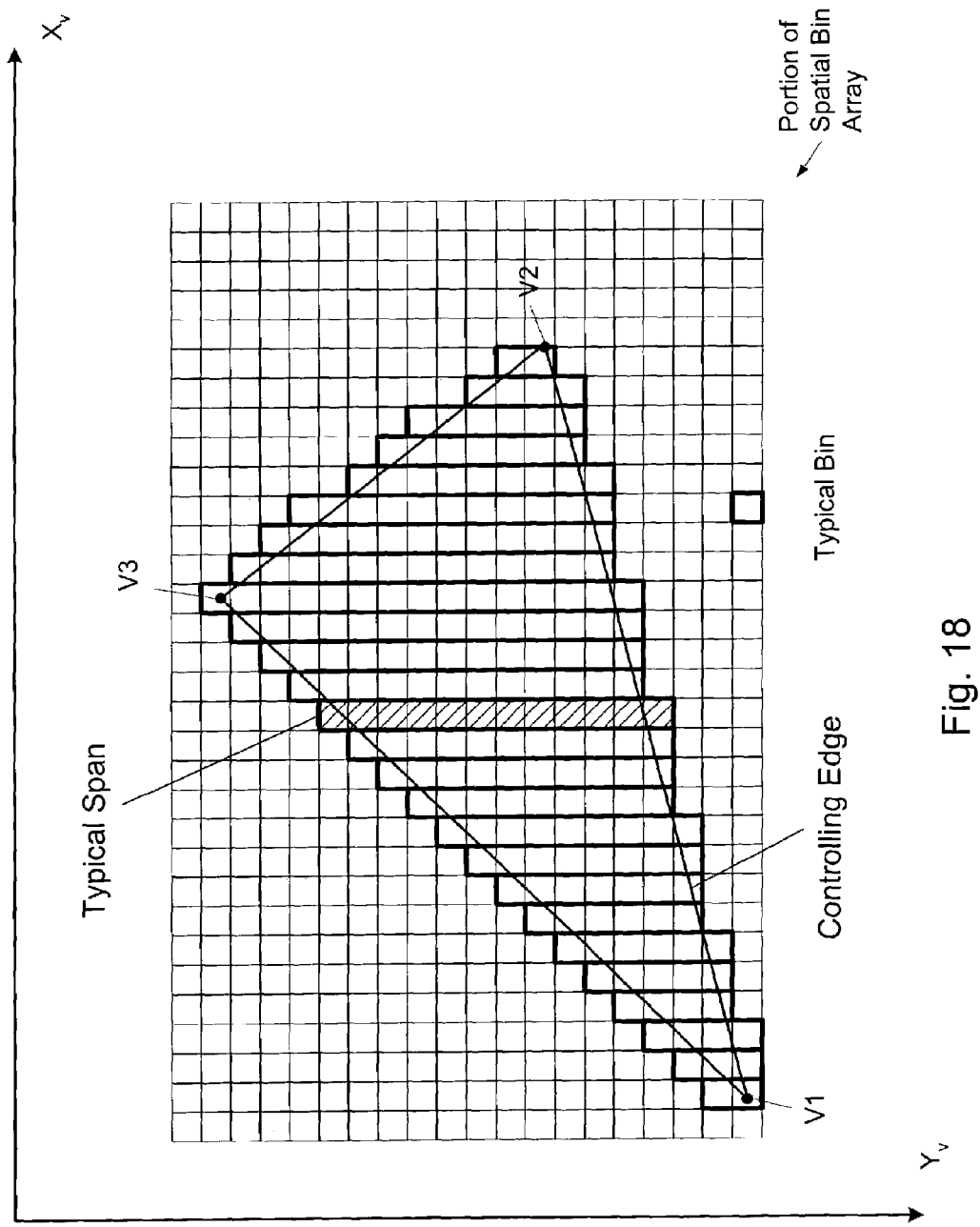
FIG. 18 illustrates a triangle covered by a series of spans.

A triangle may be imagined as being covered by a set of bin spans as suggested by FIG. 18. A typical one of the spans is denoted in cross hatch. The bin spans may be oriented horizontally or vertically depending on the geometry of the triangle. Each bin span is a line of spatial bins that extends from a controlling edge to one of the opposite edges of the triangle. The controlling edge may be defined as the edge which has the largest $L^\infty$ length, i.e. length measured in the sense of the $L^\infty$ norm. The $L^\infty$ norm of a vector is the maximum of the absolute value of its components.

The edge walker EW may walk along the controlling edge and the opposite edge(s) computing data that defines the extent of each bin span. This data is referred to herein as span boundary data.

In one set of embodiments, the span walker SW may receive the span boundary data, and compute a set $S_B$ of sample fill parameters and a texture coordinate vector $VEC_B$ for each bin B in each span. The span walker may forward the set $S_B$ of sample fill parameters to a sample fill unit SFU where they are used to interpolate color, alpha and Z at sample positions within the corresponding bin B. (In one set of embodiments, the sample fill unit includes a sample position generator SPG and a sample evaluator SE as shown in FIG. 17.) In addition, the span walker may forward the texture coordinate vector $VEC_B$ to the texture address unit TAU to induce the generation of texture values for the corresponding bin B.

The sample position generator SPG may populate a bin B with sample positions. The sample evaluator SE may determine which of the sample positions in the bin reside interior to the current triangle. Furthermore, the sample evaluator SE may interpolate sample component values such as red, green, blue, alpha and Z at each of the interior sample positions using the sample fill parameters $S_B$ and other pre-computed parameters (such as the horizontal and vertical rates of change of the color components, alpha and Z). The collection of sample components corresponding to a sample position is referred to herein as a sample. The samples corresponding to the bin B (i.e. the samples computed at the interior sample positions) may be forwarded to the texture environment TE.

One or more layers of texture information and/or other image information may be stored in memory 322. The texture address unit TAU may receive the texture coordinate vector $VEC_B$ corresponding to the bin B from the span walker SW, and generate a set of one or more read addresses (in the address space of memory 322) in response to receiving the texture coordinate vector. The texture buffer interface TBI uses the read addresses to induce the transfer of corresponding texels (or groups of texels) to texture read buffer TRB. The texture read buffer TRB serves as a cache for texels. Texture filter TF may access texels from the texture read buffer TRB and filter (e.g., perform linear, bilinear, or trilinear filtering on) the texels to generate one or more texture values for the bin B. (The texture coefficient table TCT stores texture coefficients for the texture filtering operation.) The texture values may be forwarded to the texture environment TE through data transfer multiplexor DXM and data transfer unit DXU.

The texture environment TE may apply the texture values which have been generated for the bin B to the samples (especially to the color components of the samples) of the bin B, thus generating modified samples. The texture environment may employ any of a variety of computational methods to apply the texture values to the samples. In one embodiment, the texture environment includes programmable circuitry for applying the texture values to the samples. In another embodiment, the texture environment may include dedicated circuitry for applying the texture values to the samples according to an equation (or algorithm) with fixed structure. In other embodiments, the texture environment may use some combination of programmable circuitry and dedicated circuitry.

The modified samples generated by the texture environment may be forwarded to scheduling network 400 through the fragment processor FP, sample buffer address unit SBA and interface SCI. Alternatively, if multiple layers of texture are to be applied, the modified samples may be stored into the texture accumulation buffer TAB. The texture accumulation buffer TAB may be used as a parking area for samples between the application of successive layers of texture.

Multi-Texturing Methodology

Figure 19:
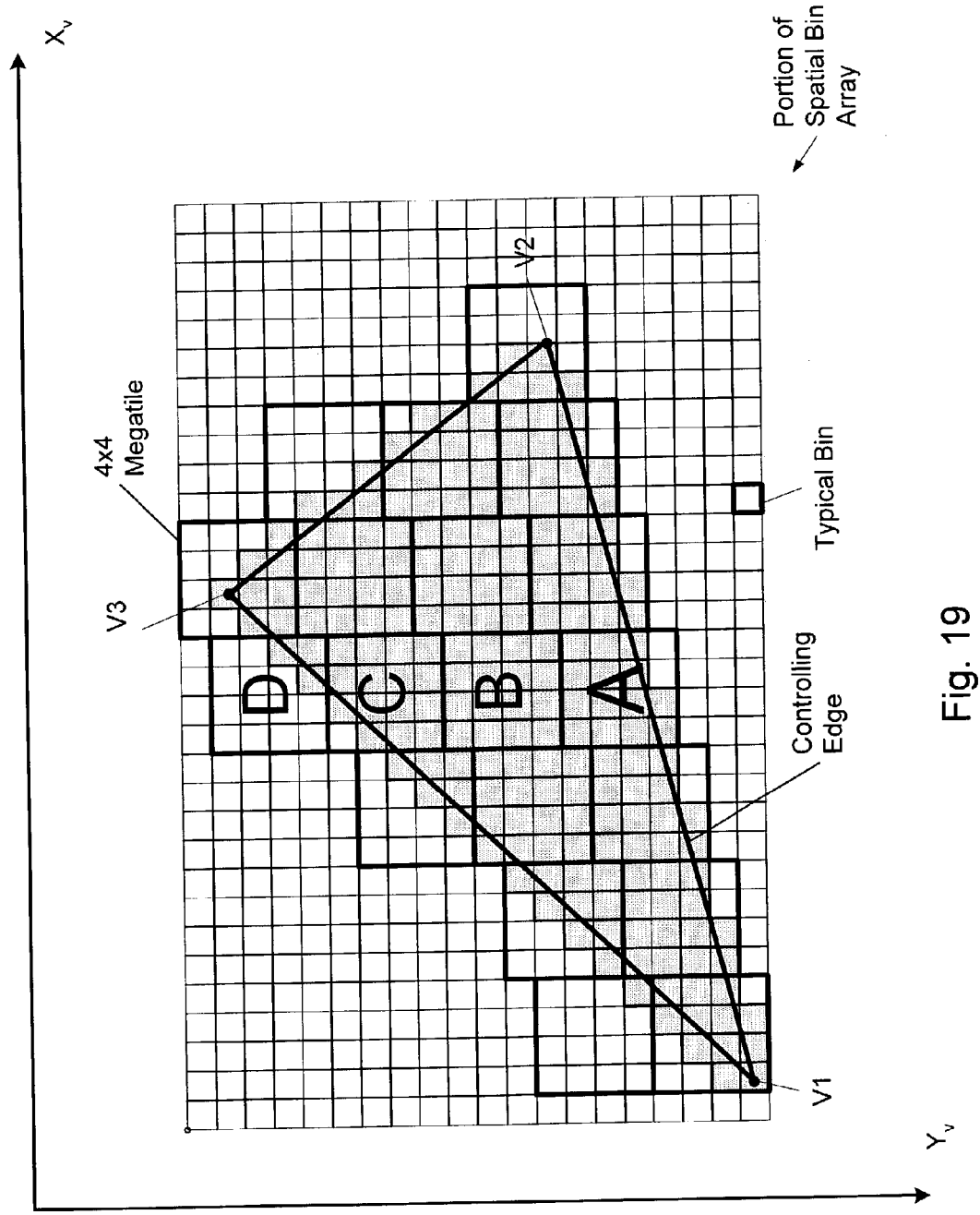
FIG. 19 illustrates a triangle covered by a collection of supertile segments.

In one set of embodiments, the rendering unit 320 may be configured to apply multiple layers of texture to geometric primitives as suggested by FIG. 19. In particular, the span walker SW may be configured to walk a K×L rectangle of bins across successive segments which cover the primitive, where K and L are positive integer values. FIG. 19 illustrates the K=L=4 case. The K×L rectangle is referred to herein as a supertile. A segment is a line of supertiles extending from the controlling edge to an opposite edge of the triangle. For example, supertiles A, B, C and D form a segment. K denotes the number of bins in the direction of the segment. L denotes the number of bins in the direction normal to the segment.

In one set of embodiments, the raster pipe (RSP) may control the application of multiple texture layers to a set of triangles according to the following methodology:

```
For each triangle {
    For each segment intersecting the triangle{
        For each supertile within segment {
            For each texture layer {
                For each internal span within supertile {
                    For each candidate bin along internal span{
                        Generate texture values for candidate bin;
                        Interpolate samples for candidate bin, or
                            read samples for candidate bin from
                            TAB;
                        Apply texture values to samples of candidate
                            bin;
                        Send updated samples to TAB or
                            to sample buffer through scheduling
                            network 400;
} } } } } }
```

A bin is said to be a candidate bin if it has a non-empty intersection with the triangle. A span is a line of bins that extends from a controlling edge of the triangle to an opposite edge of the triangle. An internal span is that portion of a span that intersects the current supertile. Observe that each texture layer is applied to each of the candidate bins in a supertile before advancing to the next texture layer. Furthermore, each of the texture layers is applied to the supertile before advancing to the next supertile.

The samples of the candidate bins within a supertile are stored in the texture accumulation buffer TAB between the application of successive texture layers. The dimensions K and L of the supertile may be selected so that the number of bins per supertile times the sample density $N_{s/b}$ (i.e., the number of samples stored per bin in the sample buffer 500, or equivalently, the number of sample positions generated per bin) equals the sample capacity of the texture accumulation buffer TAB:

$$K^*L^*N_{s/b}=C_{TAB}.$$

This dimension selection criterion implies that the texture accumulation buffer will not overflow. Furthermore, it implies that the texture accumulation buffer will get filled up (i.e., maximally utilized) for those supertiles such as supertile B that reside interior to the triangle.

In some alternative embodiments, the dimensions K and L of the supertile may be selected so that the number of bins per supertile times the sample density $N_{s/b}$ is less than but close to the sample capacity of the texture accumulation buffer TAB, i.e.

$$\beta C_{TAB} \leq K^*L^*N_{s/b} < C_{TAB},$$

where the fraction $\beta<1$ is close to one. For example, in one set of embodiments, $\beta$ may equal $1-2^{-G}$, where G is a positive integer greater than or equal to three. In some embodiments, the parameter $\beta$ may be programmable. A system implementing this alternative dimension selection criterion may retain many of the benefits of a system implementing the strict equality criterion above.

In some embodiments, sample interpolation may be performed once for each candidate bin within a supertile in anticipation of the application of the first texture layer. The first texture layer is applied to the interpolated samples resulting in updated samples. The updated samples are stored in the texture accumulation buffer TAB. The second and succeeding texture layers may be applied to samples as read from the texture accumulation buffer TAB.

The dimensions K and L of the supertile may be selected so as to increase the efficiency of utilization of the texture cache (i.e. texture read buffer TRB), or, in other words, to the increase the probability of experiencing cache hits in the texture cache during texel reads. In one set of embodiments, the dimensions K and L are equal so that the supertile is a square, or approximately equal so that the supertile is almost square.

In some embodiments, the values K and L may be programmable. For example, the values K and L may be dynamically adjusted.

In one collection of embodiments, the span walker SW traverses the candidate bins within the supertile generating a texture request to texture address unit TAU and a sample fill request to the sample fill unit SFU for each candidate bin as described above. After completing the traversal of the candidate bins in the supertile with respect to a first texture layer, the span walker again traverses the candidate bins of the supertile, this time generating texture requests with respect to a second texture layer. More generally, the span walker may perform a traversal of the candidate bins of the supertile for each of the texture layers.

In one embodiment, the edge walker EW may be configured to generate span boundary data for two adjacent spans (or, more generally, a plurality of adjacent spans) at a time. A pair of adjacent spans is referred to as a stripe. The span walker SW may be configured to traverse each supertile with a 2×2 tile of bins (or, more generally, a P×Q tile of bins, where P and Q are positive integers) in a fashion that respects the boundaries between stripes. In other words, the span walker SW may move the 2×2 tile within the supertile along portions of stripes internal to the supertile until the supertile has been covered. Thus, supertile dimensions K and L may be even integers (or, more generally, multiples of P and Q respectively).

For each position of the tile within the supertile, the span walker may generate sample fill data and texture coordinate vector data for each bin in the tile, forward the sample fill data to the sample fill unit (or to multiple parallel sample fill units) to induce sample generation, and forward the texture coordinate vector data to the texture address unit (or multiple parallel texture address units) to induce texture generation.

When the tile crosses the boundary of the supertile for a given stripe, the span walker may save sample fill data such as edge intercepts and root values (for component interpolation) in a set of internal registers, and restart the tile in the next available stripe of the supertile. These saved values may be looked up later when the span walker has advanced to the next supertile.

Figure 20:
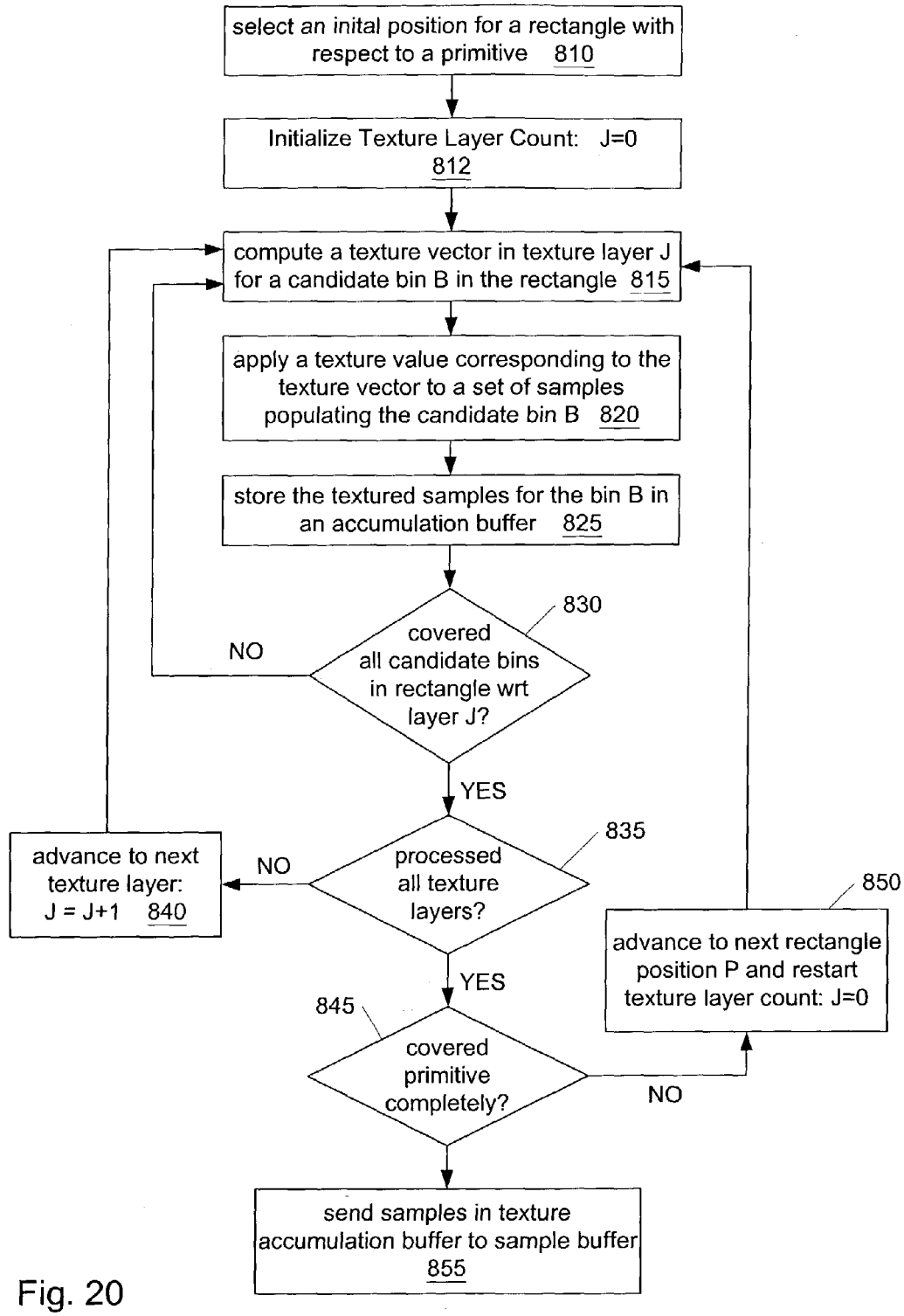
FIG. 20 illustrates one embodiment of a method for rendering a primitive.

FIG. 20 illustrates one set of embodiments of a method for rendering a primitive such as a triangle. In step 810, a processing system (i.e., any desired combination of programmable hardware and/or dedicated hardware) may select an initial position for a rectangle (e.g. the K×L rectangular supertile described above) with respect the primitive. In one embodiment, the processing system is rendering unit 320.

In step 810, the processing system may initialize a texture layer count J to zero. The texture layer count is used to designate which texture layer the processing system is operating on (from among a plurality of texture layers stored in a texture memory such as memory 322).

In step 815, the processing system may compute a texture coordinate vector corresponding to a texture layer J for a candidate bin B in the rectangle. A candidate bin is a bin that geometrically intersects the primitive.

In step 820, the processing system may apply a texture value corresponding to the texture coordinate vector to a set of samples populating the candidate bin B resulting in textured samples. (If J>0, the sample to be textured are accessed from an accumulation buffer.)

In step 825, the processing system may store the textured samples for the bin B into the accumulation buffer (e.g. texture accumulation buffer TAB).

In step 830, the processing system may determine if all the candidate bins in the rectangle have been visited with respect to texture layer J. If all the candidate bins in the rectangle have been visited with respect to texture layer J, processing continues with step 835. Otherwise, processing continues with step 815 so that another candidate bin may be textured with respect to texture layer J.

In step 835, the processing system may determine if all the texture layers have been processed (i.e. applied to the candidate bins of the rectangle in its current position). If all the texture layers have been processed, processing continues with step 845. Otherwise processing continues with step 840.

In step 840, the processing system may advance to the next texture layer among the plurality of texture layers stored in the texture memory. This advancement is represented in the figure by the expression J=J+1. Then processing resumes with step 815.

In step 845, the processing system may determine if the succession of areas visited by the rectangle has covered the primitive. If the primitive has been completely covered, processing continues with step 855. Otherwise processing continues with step 850.

In step 850, the processing system may advance the position of the rectangle and restart the count of texture layers: J=0. Then processing resumes with step 815.

In step 855, the processing system may send the multi-textured samples in the accumulation buffer to the sample buffer 500. The filtering engine 600 may read and filter the multi-textured samples from the sample buffer to generate video pixels which are used to drive a video output signal.

In some embodiments, the processing system may be configured to sense when the last layer of texture is being processed, and to bypass step 825, i.e., the storage of the final textured samples into the accumulation buffer during processing of the last layer, in order to facilitate a more direct transfer of the final textured samples to the sample buffer 500.

In one collection of embodiments, a method for rendering a primitive into samples may be configured to operate in a processing system (e.g., any combination of programmable hardware and/or dedicated hardware) as follows. The processing system may:

(a) compute a texture coordinate vector for a bin B in a rectangle, where the bin has a non-empty intersection with the primitive, where the texture coordinate vector corresponds to a first layer of texture stored in a texture memory;

(b) apply a texture value corresponding to the texture coordinate vector to a set of samples populating the bin B, where the texture value is derived from the first layer of texture stored in the texture memory; and (c) store the textured samples for the bin B into a texture accumulation buffer.

In addition, the processing system may:

(d) perform (a), (b) and (c) for each bin B, in the rectangle, which intersects the primitive;

(e) perform (d) for each texture layer stored in the texture memory; and (f) perform (e) for a succession of positions of the rectangle until the primitive has been covered.

It is noted that the set of samples populating a bin B may be empty if all the sample positions in the bin B fall outside the primitive. If the set of sample populating the bin B is empty, then the application step (b) and storage step (c) are not performed for bin B.

The sample capacity of the rectangle may be equal to (or less than but approximately equal to) the sample capacity of the texture accumulation buffer. In some embodiments, the sample capacity of the rectangle may be less than the sample capacity of the texture accumulation buffer by a small fraction, such as 10%, 5%, 2%, 1%, 0.5%, 0.1%, 0.05%, etc.

The sample density, i.e. the number of sample positions generated per candidate bin, is a positive integer, and may be programmable parameter. For example, in one embodiment, the sample density may take a set of values in the range from 1 to 16 inclusive.

While many of the embodiments described above have been presented in terms of graphics accelerator 100 which computes samples and filters the samples to generate pixels, it is understood that the inventive principles described herein apply to a wide variety of graphics system architectures. In particular, these inventive principles may be applied to a graphics system which generates pixels directly without the intervening steps of computing and filtering samples. In this case, the bins of FIG. 19 may be reinterpreted as pixels, and the above method may be re-expressed in terms of applying texture to pixels instead of to samples and storing pixels instead of samples into the texture accumulation buffer.

While many of the embodiments described above focus on a span walker configured to traverse primitives with a rectangular supertile, the inventive principles described herein apply to other geometric shapes. Thus, in other embodiments, the supertile may be a triangle, a hexagon, a parallelogram, or, more generally, any geometric shape that is capable of tiling space (i.e., filling space without overlap).

Please refer to the following patent applications additional teachings on the subject of multi-texturing of graphical primitives:

U.S. patent application Ser. No. 09/861,468, filed on May 18, 2001, entitled "Graphics Data Accumulation for Improved Multi-Layer Texture Performance", invented by Lavelle et al.; and U.S. patent application Ser. No. 09/861,192, filed on May 18, 2001, entitled "Graphics Primitive Size Estimation and Subdivision for Use with a Texture Accumulation Buffer", invented by Lavelle et al.

Each of these patent applications is hereby incorporated by reference in its entirety as though fully and completely set forth herein.

Numerous variations and modifications will become apparent to those skilled in the art once the above disclosure is fully appreciated. It is intended that the following claims be interpreted to embrace all such variations and modifications.

What is claimed is:

1. A graphics system comprising:
   a texture memory configured to store a plurality of layers of texture data;
   a texture accumulation buffer;
   a span walking unit configured to traverse a first primitive with a rectangle of bins, wherein the number of bins in the rectangle of bins is selected so that a sample capacity of the rectangle is less than or equal to the texture accumulation buffer's sample capacity, and wherein the sample capacity of the rectangle equals the number of bins contained in the rectangle times the number of samples per bin; and
   a texture environment unit configured to apply texture values to samples and to store the textured samples in the texture accumulation buffer between the application of successive layers of the texture data layers.

2. The graphics system of claim 1, wherein a union of successive areas visited by the rectangle in said traversal cover the first primitive, wherein, for each position P of the rectangle in said traversal, the span walking unit is configured to repeatedly walk over candidate bins in the rectangle, wherein each iteration I of said repeated walking over the candidate bins in the rectangle corresponds to a layer $L_I$ of the texture data layers and comprises computing a texture coordinate vector $VEC_{P,I,B}$ for the corresponding layer $L_I$ at each candidate bin B of the candidate bins in the rectangle at position P, and wherein the system further comprises a texture pipeline configured to receive each texture coordinate vector $VEC_{P,I,B}$, to read one or more texels from the corresponding texture layer $L_I$ based on the texture coordinate vector $VEC_{P,I,B}$ and to generate a texture value $TV_{P,I,B}$ using the one or more texels.

3. The graphics system of claim 2, wherein the candidate bins are bins that have a nonempty intersection with the first primitive.

4. The graphics system of claim 2, further comprising a sample fill unit configured to generate sample positions for each candidate bin B in the rectangle at position P, and to determine if the sample positions reside interior to the triangle.

5. The graphics system of claim 4, wherein the sample fill unit is further configured to compute said samples at the interior sample positions in the candidate bin B.

6. The graphics system of claim 5, wherein the texture environment unit receives the computed samples corresponding to the interior sample positions in each candidate bin B prior to application of a first of the texture data layers corresponding to a first iteration of said repeated walking.

7. The graphics system of claim 1, wherein the rectangle size and shape is determined by one or more of: user input, an algorithm, a specified number of bins, a specified array of n x m bins, and a specified array of n x n bins, and wherein n and m are positive integers.

8. The graphics system of claim 1 further comprising a sample buffer, wherein the texture environment unit is configured to transfer the samples for each bin to the sample buffer after applying a last of the texture data layers to the samples.

9. The graphics system of claim 8 further comprising a filtering engine configured to read the samples from the sample buffer and to filter the samples to generate pixels.

10. The graphics system of claim 1, wherein the rectangle is configured to be a square.

11. A method comprising:
   traversing a first primitive with a rectangle of bins, wherein a sample capacity of the rectangle of bins is equal to the sample capacity of the texture accumulation buffer, wherein the sample capacity of the rectangle of bins equals the number of bins contained in the rectangle times the number of samples per bin, wherein a union of successive areas visited by the rectangle in said traversal cover the first primitive, wherein, for each position P of the rectangle in said traversal, said traversing comprises repeatedly walking over candidate bins in the rectangle, wherein each iteration I of said repeated walking over candidate bins in the rectangle corresponds to a layer $L_I$ of a set of texture data layers stored in a texture memory and comprises computing a texture coordinate vector $VEC_{P,I,B}$ for the corresponding layer $L_I$ at each candidate bin B in the rectangle at position P;
   reading one or more texels of the texture data layer $L_I$ from the texture memory based on the texture coordinate vector $VEC_{P,I,B}$ and generating a texture value $TV_{P,I,B}$ using the one or more texels; and
   applying the texture value $TV_{P,I,B}$ to samples of the corresponding candidate bin B in the rectangle at position P, and storing the textured samples in a texture accumulation buffer between the application of successive layers of the texture data layers.

12. The method of claim 11, wherein the rectangle size and shape is determined by one or more of: user input, an algorithm, a specified number of bins, a specified array of n×m bins, and a specified array of n×n bins, and wherein n and m are positive integers.

13. The method of claim 11, wherein the sample capacity of the rectangle is less than but close to the sample capacity of the texture accumulation buffer.

14. The method of claim 11, wherein the candidate bins are bins that have a nonempty intersection with the first primitive.

15. The method of claim 11 further comprising: generating sample positions for each candidate bin B in the rectangle at position P, and determining if the sample positions reside interior to the triangle.

16. The method of claim 15 further comprising computing said samples at the interior sample positions in the candidate bin B.

17. The method of claim 16, wherein said samples are computed prior to application of a first of the texture data layers corresponding to a first iteration of said repeated walking.

18. The method of claim 11 further comprising: transferring the samples for each candidate bin B to a sample buffer after applying a last of the texture data layers to the samples; and filtering the samples from the sample buffer to generate pixels.

19. The method of claim 11, wherein the rectangle is configured to be a square.

20. A method comprising:
   (a) computing one or more texture values for a bin in a rectangle of bins, wherein the rectangle of bins intersects a primitive;
   (b) applying the one or more texture values to a set of data values associated with the bin, wherein each texture value is derived from the first layer of texture stored in the texture memory;
   (c) storing the textured data values for the bin into a texture accumulation buffer;
   (d) performing (a), (b) and (c) for each bin B, of the rectangle of bins, which intersects the primitive;
   (e) performing (d) for each texture layer among a plurality of texture layers stored in the texture memory;
   wherein memory capacity needed to store data values for the rectangle of bins is less than or equal to the memory capacity of the texture accumulation buffer.

21. The method of claim 20 further comprising:
   (f) performing (e) for a plurality of positions of the rectangle.

22. The method of claim 20, where (e) is repeated until a union of the successive areas visited by the rectangle covers the triangle.

23. The method of claim 20, wherein the set of data values corresponds to a set of one or more pixels.

24. A method comprising:
   (a) receiving information defining a geometric primitive;
   (b) computing a set of one or more texture coordinates for a bin B in a supertile, wherein the supertile intersects the primitive, wherein the set of one or more texture coordinates corresponds to a first layer of texture stored in a texture memory;
   (c) applying at least one texture value, corresponding to the set of one or more texture coordinates, to a set of one or more data values associated with the bin B, wherein said at least one texture value is derived from the first layer of texture stored in the texture memory, wherein said applying produces one or more textured data values;
   (d) storing the one or more textured data values for the bin B into a texture accumulation buffer;
   (e) performing (b), (c) and (d) for each bin B that is in the supertile and that intersects the triangle; and
   (f) performing (e) for each texture layer among a plurality of texture layers stored in the texture memory;
   wherein the number of bins included in the supertile is determined so that the number of data values associated with the bins included in the supertile is less than or equal to a capacity of the texture accumulation buffer.

25. The method of claim 24, wherein the supertile is a non-rectangular polygon.

26. The method of claim 24, wherein the number of bins included in the supertile is determined by one or more of: user input, an algorithm, a specified number of bins, and a specified array of bins.

27. The method of claim 24, further comprising: (g) performing (f) for a plurality of positions of the supertile.

28. The method of claim 24, where (f) is repeated until a union of the successive areas visited by the supertile covers the primitive.

29. A graphics system comprising:
   a means for storing a plurality of layers of texture data;
   a means for buffering textured samples;
   a means for traversing a first primitive with a supertile, wherein, for each position P of the supertile in said traversal, said traversing means is configured to walk over each candidate bin B in the supertile one or more times, wherein said one or more iterations of walking correspond respectively to one or more of the texture layers;
   a means for reading and applying texture information from the texture memory to samples in each of the candidate bins, wherein, in each of said iterations of walking, said applying means is configured to read and apply texture information from a corresponding one of the texture layers to data values associated with the samples within the supertile and to store resulting textured data values in the accumulation buffer;
   wherein the number of bins included in the supertile is determined so that the number of samples associated with the bins included in the supertile is less than or equal to a capacity for textured samples of the texture accumulation buffer.

30. The graphics system of claim 29, wherein a union of successive areas visited by the supertile in said traversal covers the first primitive.

31. The system of claim 29, wherein the supertile is a non-rectangular polygonal supertile.

32. The system of claim 29, wherein the number of bins included in the supertile is determined by one or more of: user input, an algorithm, a specified number of bins, and a specified array of bins.

* * * * *